United States Patent [19]

Herrmann et al.

[11] Patent Number: 5,942,586

[45] Date of Patent: *Aug. 24, 1999

[54] CATALYST FOR THE POLYMERIZATION OF OLEFINS, PROCESS FOR ITS PREPARATION AND ITS USE

[75] Inventors: Hans-Friedrich Herrmann, Darmstadt; Bernd Bachmann, Eppstein/Taunus; Bernhard Hierholzer, Frankfurt am Main; Walter Spaleck, Liederbach/Taunus, all of Germany

[73] Assignee: Targor GmbH, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/473,268

[22] Filed: Jun. 7, 1995

Related U.S. Application Data

[62] Division of application No. 08/040,671, Mar. 31, 1993.

[30] Foreign Application Priority Data

Apr. 1, 1992 [DE] Germany .............................. 42 10 780

[51] Int. Cl.$^6$ ...................................................... C08F 4/44
[52] U.S. Cl. .................. 526/160; 526/127; 526/904; 526/943; 525/319; 525/322; 525/324; 521/54; 521/134; 521/142; 521/143
[58] Field of Search .................... 526/943, 904, 526/160, 127; 521/54, 134, 142, 143; 525/319, 322, 324

[56] References Cited

U.S. PATENT DOCUMENTS

| | | | |
|---|---|---|---|
| 4,404,344 | 9/1983 | Sinn et al. ............................ | 526/160 |
| 4,623,707 | 11/1986 | Bedell et al. .......................... | 526/142 |
| 4,808,561 | 2/1989 | Welborn, Jr. ......................... | 502/117 |
| 4,871,705 | 10/1989 | Hoel ..................................... | 502/117 |
| 4,925,821 | 5/1990 | Chang .................................. | 502/107 |
| 5,008,228 | 4/1991 | Chang .................................. | 502/111 |
| 5,126,301 | 6/1992 | Tsutsui et al. ........................ | 502/117 |
| 5,126,303 | 6/1992 | Resconi et al. ....................... | 502/117 |
| 5,153,157 | 10/1992 | Hlatky et al. ......................... | 502/117 |
| 5,198,399 | 3/1993 | Hoff et al. ............................ | 502/111 |
| 5,346,925 | 9/1994 | Sugano et al. ........................ | 521/54 |

FOREIGN PATENT DOCUMENTS

| | | |
|---|---|---|
| 54570/90 | 11/1990 | Australia . |
| 73820/91 | 11/1991 | Australia . |
| 0 295 312 | 12/1988 | European Pat. Off. . |
| 0 442 725 | 8/1991 | European Pat. Off. . |
| 0 518 092 | 12/1992 | European Pat. Off. . |
| 0 522 581 | 1/1993 | European Pat. Off. . |
| 63 92 621 | 4/1988 | Japan . |
| 90/05149 | 5/1990 | WIPO . |
| 91/05810 | 5/1991 | WIPO . |

*Primary Examiner*—Jeffrey Smith
*Assistant Examiner*—Roberto Rabago
*Attorney, Agent, or Firm*—Connolly & Hutz

[57] ABSTRACT

Catalyst for the polymerization of olefins, process for its preparation, and its use.

The present invention relates to a supported catalyst for the polymerization of olefins, which can be prepared by reacting the reaction product formed from an aluminoxane and at least one metallocene with a microporous, polymeric support.

20 Claims, No Drawings

CATALYST FOR THE POLYMERIZATION OF OLEFINS, PROCESS FOR ITS PREPARATION AND ITS USE

This application is a divisional of application Ser. No. 08/040,671 filed Mar. 31, 1993.

The present invention relates to a supported (heterogeneous) catalyst which can advantageously be employed in the polymerization of olefins.

Processes are known for the preparation of polyolefins with the aid of homogeneous catalyst systems comprising a transition-metal component of the metallocene type and a cocatalyst component, an oligomeric aluminum compound of the aluminoxane type (usually methylaluminoxane), which have high activity and give polymers or copolymers having a narrow molecular weight distribution (cf. EP-A-69 951).

A major disadvantage of these soluble (homogeneous) metallocene/methylaluminoxane catalyst systems in processes in which the polymer formed is produced as a solid is the formation of thick coatings on the reactor walls and the stirrer. These coatings are formed by agglomeration (Polymer Commun. (1991) 32, 58) of the polymer particles whenever the metallocene or aluminoxane or both are dissolved in the suspension medium. Coatings of this type in the reactor systems must be removed regularly since they rapidly achieve considerable thicknesses, have high strength and hinder heat exchange with the cooling medium.

In order to prevent coating formation in the reactor, supported catalyst systems have been proposed in which the metallocene and/or the aluminum compound serving as cocatalyst are fixed to an inorganic support material (cf. EP-A-206 794). However, the inorganic support material thereby introduced into the polymer product reduces the product quality. EP-A 285 443 and EP-A 295 312 describe a polymerization system in which inorganic oxides and organic polymers are used as supports for metallocenes. Here, the cocatalyst, methylaluminoxane, is precipitated onto the support using a solvent in which it has low solubility. In particular when polymeric supports are used, detachment of the catalyst components from the support by the suspension medium or the liquid monomers takes place under the polymerization conditions.

JP 63,092,621 describes a gas-phase catalyst for the preparation of ethylene copolymers which is formed by applying a solution of metallocene and methylaluminoxane to granular polyethylene powder. The ready detachability of the support again restricts the area of application to gas-phase polymerization.

The object was therefore to find a catalyst system or a polymerization process which avoids the disadvantages known from the prior art. Particularly, a catalyst system of this type should be inexpensive to prepare and should be universally applicable without significant impairment of its activity.

Surprisingly, good and simple support which can be employed universally in all polymerization processes is obtained if the product of the reaction of an organo-aluminum compound A and a transition-metal compound B is reacted with a specific polymeric support component C.

The present invention thus relates to a supported polymerization catalyst which can be prepared by reacting the reaction product formed from an aluminoxane and at least one metallocene with a microporous, polymeric support.

According to the invention, it is also possible to employ mixtures of various aluminoxanes and/or a plurality of metallocenes. The use of a plurality of metallocenes gives access to, in particular, polymers and reactor blends with a broad molecular weight distribution. However, it is preferred to use one metallocene.

The aluminoxane used is preferably a compound of the formula (II)

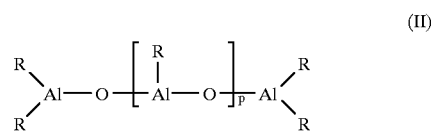

(II)

for the linear type and/or of the formula (III)

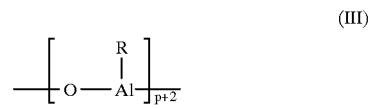

(III)

for the cyclic type, where, in the formulae (II) and (III), the radicals R may be identical or different and are a $C_1$–$C_6$-alkyl group, a $C_6$–$C_{18}$-aryl group, benzyl or hydrogen, and p is an integer from 2 to 50, preferably from 10 to 35.

The radicals R are preferably identical and are methyl, isobutyl, n-butyl, phenyl or benzyl, particularly methyl.

If the radicals R are different, they are preferably methyl and hydrogen, methyl and isobutyl or methyl and n-butyl, where hydrogen and isobutyl or n-butyl preferably make up 0.01–40% of the number of radicals R.

The aluminoxane can be prepared in various ways by known processes. One of the methods is, for example, to react an aluminum hydrocarbon compound and/or a hydridoaluminum hydrocarbon compound with water (in the form of a gas, solid, liquid or in bound form, for example as water of crystallization) in an inert solvent (such as, for example, toluene). To prepare an aluminoxane containing different alkyl groups R, two different trialkylaluminum compounds ($AlR_3$+$AlR'_3$), in accordance with the desired composition and reactivity, are reacted with water (cf. S.Pasynkiewicz, Polyhedron 9 (1990) 429 and EP-A 302 424).

The precise structure of the aluminoxanes II and III is unknown.

Irrespective of the preparation method, all aluminoxane solutions have in common a varying content of unreacted aluminum starting compound, in free form or as an adduct.

The transition-metal compound used in the catalyst according to the invention is a metallocene. In principle, any metallocene can be employed, irrespective of the structure and composition. The metallocenes may be either bridged or unbridged, and contain identical or different ligands. They are compounds of metals from groups IVb, Vb or VIb of the Periodic Table, for example compounds of titanium, zirconium, hafnium, vanadium, niobium, tantalum, chromium, molybdenum or tungsten, preferably of zirconium, hafnium and titanium, in particular of zirconium.

Metallocenes of this type are known and are described, for example, in the following documents: EP-A-336 127, EP-A-

336 128, EP-A-387 690, EP-A-387 691, EP-A-302 424, EP-A-129 368, EP-A-320 762, EP-A-284 707, EP-A-316 155,

EP-A-351 392, U.S. Pat. No. 5,017,714 and J. Organomet. Chem., 342 (1988) 21.

Of particular interest are metallocenes, specifically zirconocenes, which carry indenyl derivatives as ligands.

These are preferably the compounds of the formula I below

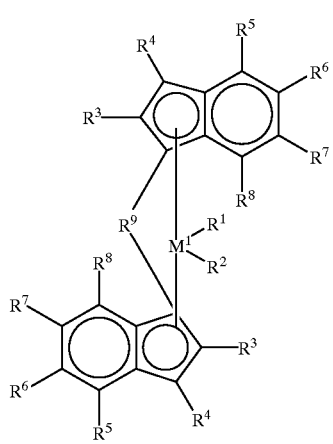
(I)

in which

M$^1$ is a metal from group IVb, Vb or VIb of the Periodic Table,

R$^1$ and R$^2$ are identical or different and are a hydrogen atom, a C$_1$–C$_{10}$-alkyl group, a C$_6$–C$_{10}$-alkoxy group, a C$_6$–C$_{10}$-aryl group, a C$_6$–C$_{10}$-aryloxy group, a C$_2$–C$_{10}$-alkenyl group, a C$_7$–C$_{40}$-arylalkyl group, a C$_7$–C$_{40}$-alkylaryl group, a C$_8$–C$_{40}$-arylalkenyl group, an OH group or a halogen atom, the radicals R$^3$ are identical or different and are a hydrogen atom, a halogen atom, a C$_1$–C$_{10}$-alkyl group, which may be halogenated, a C$_6$–C$_{10}$-aryl group, or an —NR$_2$, —SR, —OSiR$_3$, —SiR$_3$ or PR$_2$ radical, in which R is a halogen atom, a C$_1$–C$_{10}$-alkyl group or a C$_6$–C$_{10}$-aryl group, R$^4$ to R$^8$ are as defined for R$^3$ or adjacent radicals R$^4$ to R$^8$, together with the atoms connecting them, form an aromatic or aliphatic ring, R$^9$ is

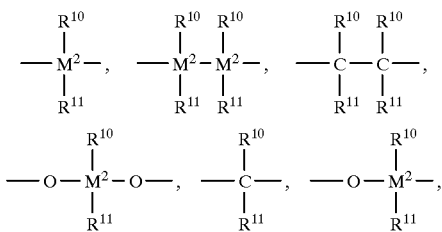

-continued

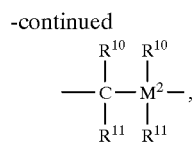

=BR$^{10}$, =AlR$^{10}$, —Ge—, —Sn—, —O—, —S—, =SO, =SO$^2$, =NR$^{10}$, =Co, =PR$^{10}$ or =P(O)R$^{10}$, where R$^{10}$ and R$^{11}$ are identical or different and are a hydrogen atom, a halogen atom, a C$_1$–C$_{10}$-alkyl group, a C$_1$–C$_{10}$-fluoroalkyl group, a C$_6$–C$_{10}$-aryl group, a C$_6$–C$_{10}$-fluoroaryl group, a C$_1$–C$_{10}$-alkoxy group, a C$_2$–C$_{10}$-alkenyl group, a C$_7$–C$_4$-arylalkyl group, a C$_8$–C$_{40}$-arylalkenyl group, or a C$_7$–C$_{40}$-alkylaryl group, or R$^{10}$ and R$^{11}$, in each case with the atoms connecting them, form a ring, and M$^2$ is silicon, germanium or tin.

The 4,5,6,7-tetrahydroindenyl analogs corresponding to the compounds I are likewise of importance.

In the formula I, it is preferred that

M$^1$ is zirconium,

R$^1$ and R$^2$ are identical and are methyl or chlorine, in particular chlorine, R$^3$–R$^8$ are hydrogen or C$_1$–C$_4$-alkyl, R$^9$ is

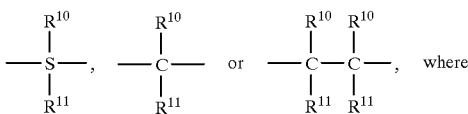

R$^{10}$ and R$^{11}$ are identical or different and are C$_1$–C$_4$-alkyl or C$^6$–C$_{10}$-aryl. In particular, R$^{10}$ and R$^{11}$ are identical or different and are methyl or phenyl.

The indenyl or tetrahydroindenyl ligands in the formula I are preferably substituted in the 2-, 2,4-, 4,7-, 2,6-, 2,4,6-, 2,5,6-, 2,4,5,6- or 2,4,5,6,7-positions, in particular in the 2,4,6-position. Substitution is preferably by a C$_1$–C$_4$-alkyl group, such as, for example, methyl, ethyl or isopropyl. The 2-position is preferably substituted by methyl.

Also of particular importance are compounds I in which the substituents in the 4- and 5-position of the indenyl radicals (R$^5$ and R$^6$), together with the atoms connecting them, form a benzene ring. This fused ring system may likewise be substituted by radicals as defined for R$^3$–R$^8$. An example which may be mentioned of such compounds I is dimethylsilanediylbis(2-methyl-4,5-benzoindenyl) zirconium dichloride.

The metallocenes I are particularly suitable for the preparation of high-molecular-weight polyolefins of high stereoregularity.

The metallocenes I and the metallocenes described in the cited documents can be prepared, for example, in accordance with the reaction scheme below:

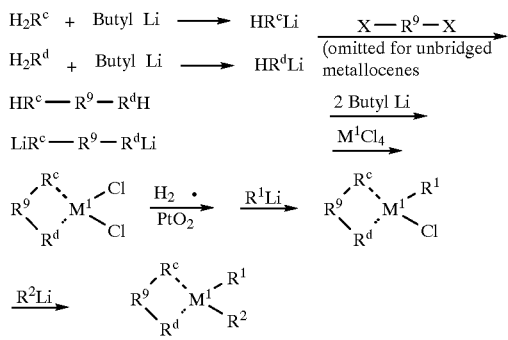

X=Cl, Br, I, or O-tosyl; $H_2R^c$ and $H_2R^d$=ligands, for example (subst.) indene *: additional hydrogenation step if, for example, indenyl ligands are to be converted into tetrahydroindenyl ligands.

The preparation processes are known in principle from the literature; cf. Journal of Organometallic Chem. 288 (1985) 63–67, EP-A-320 762 and the cited documents regarding the metallocenes described therein.

The compounds I are prepared using variously substituted indenes as starting materials ($H_2R^c$ and $H_2R^d$; cf. the reaction scheme shown). Some of these indene derivatives are known and commercially available. Specifically substituted indenes can be prepared by the process shown below:

a) $H_2R^c$, $H_2R^d$ =

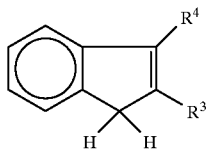

The synthesis is carried out in accordance with or analogously to the following references:

J.Org.Chem., 49 (1984) 4226–4237, J.Chem.Soc., Perkin II, 1981, 403–408, J.Am.Chem.Soc., 106 (1984) 6702, J.Am. Chem.Soc., 65 (1943) 567, J.Med.Chem., 30 (1987) 1303–1308, Chem.Ber. 85 (1952) 78–85.

b) $H_2R^c$, $H_2R^d$ =

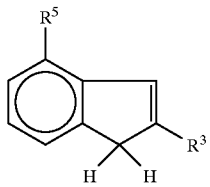

The 2,4-substituted indenes $H_2R^c$ and $H_2R^d$ used as starting substances can be prepared by 2 different routes:

b1) The starting compound used is a ketoaldehyde of the formula shown in the reaction scheme below, whose preparation is known (Synthesis 1985, 1058).

The reaction of this ketoaldehyde with cyclopentadiene is carried out in an inert solvent in the presence of a base. Preference is given to alcohols, such as methanol, ethanol or t-butanol, in particular methanol.

The bases used can be a large number of compounds. Examples which may be mentioned are alkali metal and alkaline earth metal hydroxides, alkali metal and alkaline earth metal alkoxides, such as sodium methoxide, sodium ethoxide and potassium tert-butoxide, amides, such as lithium diisopropylamide or amines. Preference is given to sodium ethoxide, potassium tert-butoxide and potassium hydroxide.

The molar ratios of the starting compounds, including the base used, can vary within broad limits. The ketoaldehyde:cyclopentadiene:base ratio is preferably 1:1–1.5:2–3, in particular 1:1.1:2.5.

The reaction temperature is preferably from −40° C. to 100° C., in particular from 0° C. to 25° C.

The reaction times generally vary between 10 minutes and 100 hours, preferably between 1 hour and 30 hours.

The substituent in the 2-position can be introduced by a Grignard reaction after the 4-monosubstituted indene has been converted into the 4-monosubstituted 2-indanone by a general working procedure (Organic Synthesis, Coll. Vol. V, 1973, 647). The subsequent elimination of water gives the 2,4-substituted indenes.

The 2,4-substituted indenes are produced as double-bond isomers, which can be employed directly for the synthesis of the corresponding metallocene complexes.

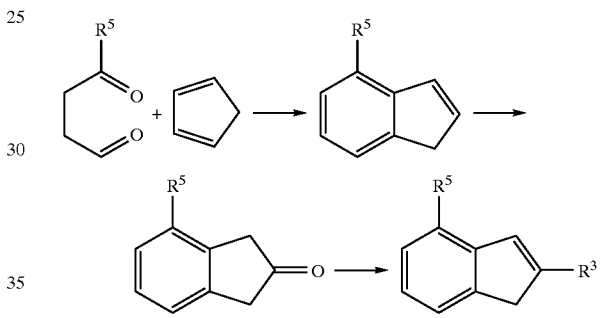

b2) Another possible and advantageous strategy proceeds in accordance with the following scheme:

A 2-substituted benzyl halide is converted into the disubstituted malonic diester analogously to a process known from the literature (J.Org.Chem. 1958, 23, 1437) by reaction with an appropriately substituted malonic diester.

Hydrolysis of diester and decarboxylation by conventional methods gives a disubstituted propionic acid derivative.

Ring closure to the 2,4-disubstituted 1-indanone is carried out by customary methods (Friedel-Crafts reaction) after the carboxylic acid has been converted into the acyl chloride.

Reduction of the ketone by known methods and subsequent elimination of water gives the 2,4-disubstituted indenes.

c) $H_2R^c$, $H_2R^d$ =

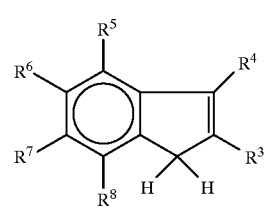

The compounds $H_2R^c$ amd $H_2R^d$ are prepared reacting a compound II

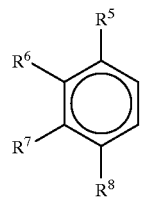

with a compound III

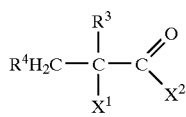

or the anhydride thereof in the presence of a Friedel-Crafts catalyst. In this formula, $X^1$ and $X^2$ are a nucleophilic leaving group, such as, for example, halogen, a hydroxyl group or a tosyl group, in particular bromine or chlorine.

This gives the indanones IV and IVa

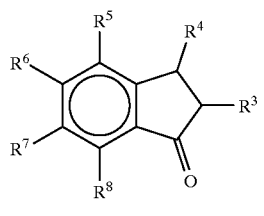

(IV)

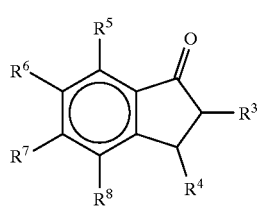

(IVa)

Depending on the substitution pattern on the aromatic ring, the indanones can be obtained in the form of two constitutional isomers of the formulae IV and IVa. These, in pure form or as a mixture, can be reduced by methods known from the literature using reducing agents such as $NaBH_4$ or $LiAlH_4$ to the corresponding indanols and subsequently dehydrated using acids, such as sulfuric acid, oxalic acid or p-toluene sulfonic acid or alternatively by treatment with dehydrating substances, such as magnesium sulfate, sodium sulfate, aluminum oxide, silica gel or molecular sieve, to give indenes of the formula V and Va ($H_2R^c$ and $H_2R^d$ respectively) (Bull. Soc. Chim. Fr.11 (1973) 3092; Organomet. 9 (1990) 3098).

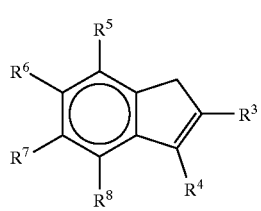

(V)

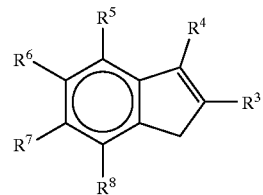

(Va)

Examples of suitable Friedel-Crafts catalysts are $AlCl_3$, $AlBr_3$, $FeCl_3$, $SbCl_5$, $SnCl_4$, $BF_3$, $TiCl_4$, $ZnCl_2$, $H_2SO_4$, polyphosphoric acid, $H_3PO_4$ or an $AlCl_3/NaCl$ melt, in particular $AlCl_3$.

Starting compounds of the formulae II and III are known and are commercially available, or can be prepared by processes known from the literature.

The reaction is carried out in an inert solvent. Preference is given to methylene chloride or $CS_2$. If the starting compound is a liquid, it is also possible to omit a solvent.

The molar ratios of the starting compounds, including the Friedel-Crafts catalyst, can vary within broad limits. The compound II:III: catalyst molar ratio is preferably 1:0.5–1.5:1–5, in particular 1:1:2.5–3.

The reaction temperature is preferably from 0° C. to 130° C., in particular from 25° C. to 80° C.

The reaction times generally vary between 30 minutes and 100 hours, preferably between 2 hours and 30 hours.

It is preferred to initially introduce a mixture of the compounds II and III and meter in the Friedel-Crafts catalyst. The reverse sequence of addition is also possible.

The indanones of the formulae IV and IVa can be purified by distillation, column chromatography or crystallization.

Substituted indenes may be produced as double-bond isomers (V/Va). These can be purified from byproducts by distillation, column chromatography or crystallization.

Starting from the indenes of the formulae V and Va, which can be employed as an isomer mixture, the preparation of the metallocenes I proceeds in accordance with processes known from the literature (cf. Au-A-31 478/89, J.Organomet.Chem. 342 (1988) 21, EP-A-284 707) in accordance with the reaction scheme shown.

d) $H_2R^c$, $H_2R^d =$

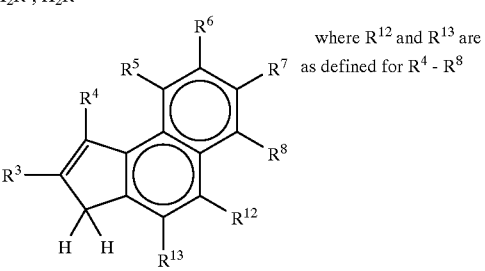

where $R^{12}$ and $R^{13}$ are as defined for $R^4$ - $R^8$

The preparation of these benzo-fused indenes and their conversion into the metallocenes I take place in accordance with the reaction scheme below:

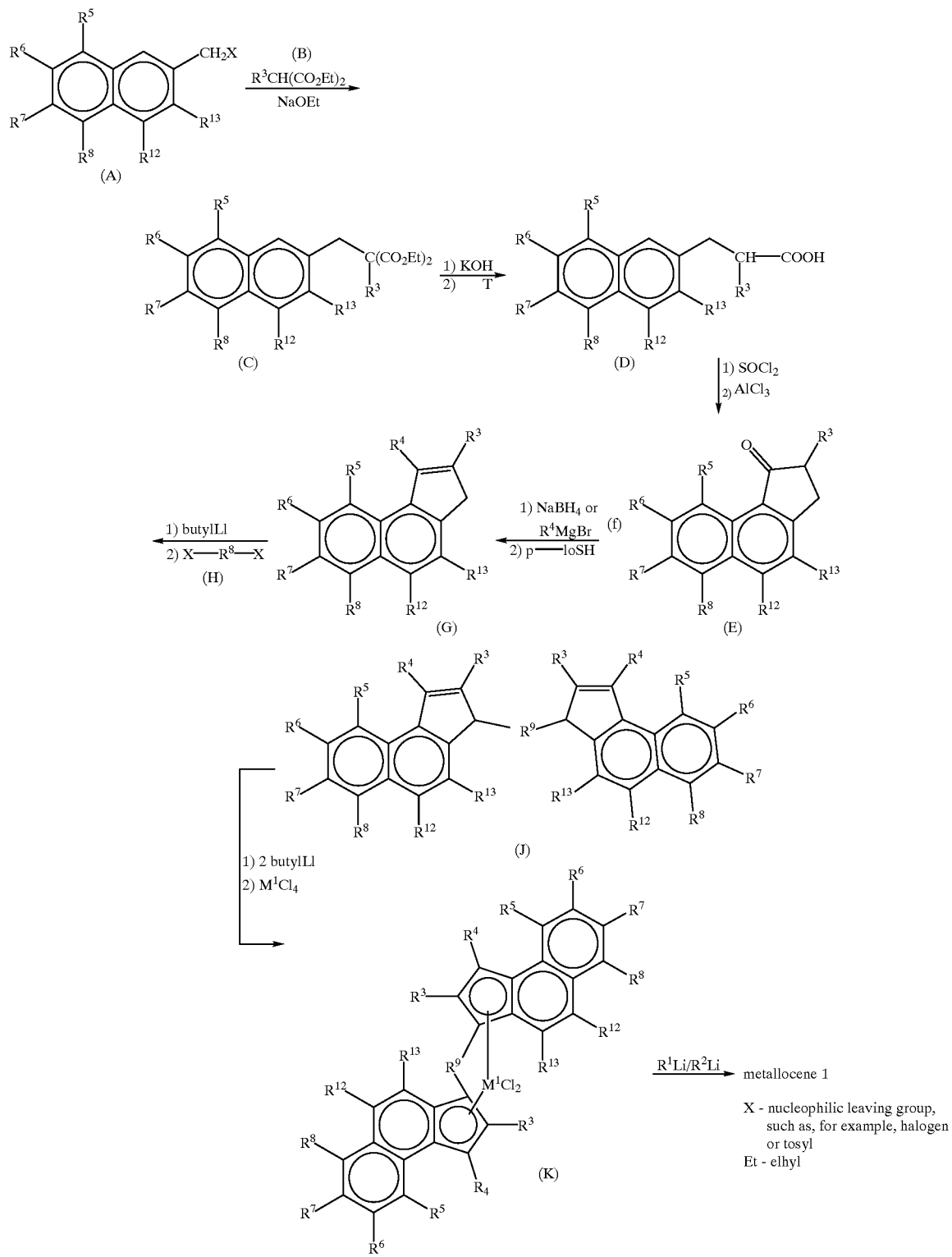

The naphthalene derivatives of the formula A are commercially available or can be prepared by methods known from the literature ("Friedel Crafts and Related Reactions", Wiley, N.Y., 1964, Vol. II, pp. 659–766, Bull. Soc. Chim. Belges, 58 (1949) 87, J. Amer. Chem. Soc. 89 (1967) 2411).

The conversion to the compounds of the formula C is carried out by methods known from the literature by reaction with substituted malonic esters of the formula B under basic conditions, such as, for example, in ethanolic solutions of sodium ethoxide (J. Org. Chem. 23 (1958) 1441, J. Am. Chem. Soc. 70 (1948) 3569).

The compounds of the formula C are hydrolyzed using alkali metal hydroxides, such as potassium hydroxide or sodium hydroxide, by methods known from the literature and are decarboxylated by thermolysis of the resultant dicarboxylic acid by methods known from the literature to give the compounds of the formula D (J. Org. Chem. 23 (1958) 1441, J. Am. Chem. Soc. 70 (1948) 3569).

The ring closure to give the substituted benzoindanones of the formula E is carried out by methods known from the literature by reaction with chlorinating reagents, such as, for example, $SOCl_2$, to give the corresponding acid chlorides and subsequent cyclization by means of a Friedel-Crafts catalyst in an inert solvent, such as, for example, with $AlCl_3$ or polyphosphoric acid in methylene chloride or $CS_2$ (Organometallics 9 (1990) 3098, Bull. Soc. Chim. Fr. 3 (1967) 988, J. Org. Chem. 49 (1984) 4226).

The conversion to the benzoindene derivatives of the formula G is carried out by methods known from the literature by reduction using the sodium borohydride or lithium aluminum hydride in an inert solvent, such as, for example, diethyl ether or THF, or by alkylation using alkylating agents of the formula F or using alkyllithium compounds to give the corresponding alcohols and dehydration of the alcohols under acidic conditions, such as, for example, using p-toluenesulfonic acid or oxalic acid, or by reaction with dehydrating substances, such as magnesium sulfate or molecular sieve (Organometallics 9 (1990) 3098, Acta. Chem. Scand. B 30 (1976) 527, J. Amer. Chem. Soc. 65 (1943) 567).

The benzoindene derivatives of the formula G can also be synthesized by another synthetic route, not shown here in greater detail, in 4 steps starting from substituted naphthalenes (Bull. Soc. Chim. Fr. 3 (1967) 988).

The preparation of the ligand systems of the formula J and the conversion to the bridged, chiral metallocenes of the formula K and the isolation of the desired racemic form are known in principle (AU-A-31 478/89, J. Organomet. Chem. 342 (1988) 21, EP 0 284 707, and EP 0 320 762). To this end, the benzoindene derivative of the formula G is deprotonated by means of strong bases, such as, for example, butyllithium, in an inert solvent and reacted with a reagent of the formula H to give the ligand system of the formula J. This is subsequently deprotonated using two equivalents of a strong base, such as, for example, butyllithium, in an inert solvent and reacted with the appropriate metal tetrahalide, such as, for example, zirconium tetrachloride, in a suitable solvent. Suitable solvents are aliphatic and aromatic solvents, such as, for example, hexane or toluene, ethereal solvents, such as, for example, tetrahydrofuran or diethyl ether, or halogenated hydrocarbons, such as, for example, methylene chloride. The racemic and the meso forms are resolved by extraction or recrystallization using suitable solvents.

The derivatization of the metallocenes of the formula I can be carried out by methods known from the literature, for example by reaction with alkylating agents, such as, for example, methyllithium (Organometallics 9 (1990) 1S39, J. Amer. Chem. Soc. 95 (1973) 6263, EP 0 277 004).

The following compounds may be mentioned as examples of metallocenes which can be used according to the invention:

biscyclopentadienylzirconium dichloride,
biscyclopentadienyldimethylzirconium,
biscyclopentadienyldiphenylzirconium,
biscyclopentadienyldibenzylzirconium,
biscyclopentadienylbistrimethylsilylzirconium,
bis(methylcyclopentadienyl)zirconium dichloride,
bis-(1,2-dimethylcyclopentadienyl)zirconium dichloride,
bis(1,3-dimethylcyclopentadienyl)zirconium dichloride,
bis(1,2,4-trimethylcyclopentadienyl))zirconium dichloride,
bis(1,2,3-trimethylcyclopentadienyl)zirconium dichloride,
bis(pentamethylcyclopentadienyl)zirconium dichloride,
bisindenylzirconium dichloride, bis(tetrahydroindenyl) zirconium dichloride,
dimethylsilylbis-1-tetrahydroindenylzirconium dichloride,
dimethylsilylbis-1-(2-methyltetrahydroindenyl) zirconium dichloride,
dimethylsilylbis-1-(2,3,5-trimethylcyclopentadienyl) zirconium dichloride,
dimethylsilylbis-1-(2,4-dimethylcyclopentadienyl) zirconium dichloride,
dimethylsilylbis-1-indenylzirconium dichloride,
dimethylsilylbis-1-indenyldimethylzirconium,
dimethylgermylbis-1-indenylzirconium dichloride,
dimethylsilylbis-1-(2-methylindenyl)zirconium dichloride,
dimethylsilylbis-1-(2-methyl-4-isopropylindenyl) zirconium dichloride,
phenylmethylsilylbis-1-(2-methylindenyl)zirconium dichloride,
dimethylsilylbis-1-(2-methyl-4-ethylindenyl)zirconium dichloride,
ethylenebis-1-(4,7-dimethylindenyl) zirconiumdichloride,
phenyl(methyl)silylbis-1-indenylzirconium dichloride,
phenyl(vinyl)silylbis-1-indenylzirconium dichloride,
diphenylsilylbis-1-indenylzirconium dichloride,
dimethylsilylbis(1-(2-methyl-4-tert-butylindenyl)) zirconium dichloride,
methylphenylsilylbis(1-(2-methyl-4-isopropylindenyl)) zirconium dichloride,
dimethylsilylbis(1-(2-ethyl-4-methylindenyl))zirconium dichloride,
dimethylsilylbis(1-(2,4-dimethylindenyl))zirconium dichloride,
dimethylsilylbis(1-(2-methyl-4-ethylindenyl)) zirconiumdimethyl,
dimethylsilylbis(2-methyl-4,6-diisopropylindenyl) zirconium dichloride,
dimethylsilylbis(2,4,6-trimethylindenyl))zirconium dichloride,
methylphenylsilylbis(2-methyl-4,6-diisopropylindenyl) zirconium dichloride,
1,2-ethanediylbis(2-methyl-4,6-diisopropylindenyl) zirconium dichloride,
dimethylsilylbis(2-methyl-4,5-benzoindenyl)zirconium dichloride,
dimethylsilyl(9-fluorenyl)cyclopentadienylzirconium dichloride,
diphenylsilyl(9-fluorenyl)cyclopentadienylzirconium dichloride,
diphenylmethylene(9-fluorenyl) cyclopentadienylzirconium dichloride, isopropylidene(9-fluorenyl)cyclopentadienylzirconium dichloride,
phenylmethylmethylene(9-fluorenyl) cyclopentadienylzirconium dichloride,
isopropylidene(9-fluorenyl)(1-(3-isopropyl) cyclopentadienyl)zirconium dichloride,
isopropylidene(9-fluorenyl)(1-(3-methyl) cyclopentadienyl)zirconium dichloride,
diphenylmethylene(9-fluorenyl)(1-(3-methyl) cyclopentadienyl)zirconium dichloride,
methylphenylmethylene(9-fluorenyl)(1-(3-methyl) cyclopentadienyl,zirconium dichloride,
dimethylsilyl(9-fluorenyl)(1-(3-methyl) cyclopentadienyl)zirconium dichloride,
diphenylsilyl(9-fluorenyl)(1-(3-methyl)cyclopentadienyl) zirconium dichloride,
diphenylmethylene(9-fluorenyl)(1-(3-tert.-butyl) cyclopentadienyl)zirconium dichloride, and
isopropylidene(9-fluorenyl)(1-3-tert.-butyl) cyclopentadienyl)zirconium dichloride.

In the preparation of the catalysts according to the invention, chiral metallocenes are preferably employed as a racemate. However, it is also possible to use the pure R- or S-form. These pure stereoisomeric forms can be used to prepare optically active polymers. However, the mesoform of the metallocenes should be separated off, since the polymerization-active center (the metal atom) in these compounds is no longer chiral due to mirror symmetry at the central metal, and it is therefore not possible to produce highly tactic polymer. If the mesoform is not separated off, atactic polymer is formed in addition to isotactic and syndiotactic polymers. For certain applications, flexible moldings for example, or for the preparation of polyethylene grades, this may be entirely desirable. The stereoisomers are separated by methods known from the literature.

The microporous, polymeric support to be used according to the invention can vary depending on the area of application and can correspond, for example, to the desired polymerization product. It is preferably a thermoplastic, such as, for example, polyethylene (PE), polypropylene (PP), polystyrene (PS), polyvinyl chloride (PVC), acrylonitrile-butadiene-styrene copolymer (ABS), polyamide (PA, for example PA-6 and PA-12), polymethylethacrylate (PMMA) or polycarbonate (PC), and is a copolymer, crosslinked polymer or polymer blend.

The characteristic feature of the polymeric supports C according to the invention is not their chemical composition, but instead their microporous structure. This microporous structure means that they have a proportion of cavities (pore volume) of at least 50% by volume, preferably at least 70% by volume, based on the total volume of the support particle or of the support material or of the support molding (see below). The total volume of the support denotes its external volume without taking into account the pore volume.

The shape of the micropores is irregular, frequently spherical. The micropores are in part connected to one another by small pore openings. The pore diameter is from about 0.1 to 10 $\mu$m. The diameter of the pore openings is preferably in the range from 1/5 to 1/50, particularly preferably not greater than 1/10, of the cell diameter.

The particle shape of the microporous support depends on the aftertreatment and may be irregular or spherical. The support particle sizes can be established as desired, for example by cryogenic grinding and screening. However, it is also possible to use the microporous polymer directly as granules, as a sheet or as a membrane for the preparation of the catalyst system according to the invention and to employ it in this form in a suitable polymerization process.

The microporous support can be prepared by various methods.

Thus, a polymer (for example polypropylene) can be mixed with a second substance (for example 50% by weight of N,N-bis-(2-hydroxyethyl)-hexadecylamine) with which it forms a single-phase mixture on heating to above the melting point of the polymer and which solidify on cooling to form a solid matrix.

The second component can subsequently be removed by means of a solvent, leaving a polymeric structure containing spherical micropores as cavities which are connected to one another through narrow pore openings.

For the preparation of microporous support materials of this type, substances in each case matched to the type of polymer, also known as cell formers, such as, for example, mixtures of soya oil and castor oil, are admixed with the polymer in extruders or other suitable equipment and later washed out, for example by propanol. Such processes for the production of powders, fibers or membranes of microporous polymers are known (cf. for example DE-2 737 745, EP-B 108 601, DE-2 833 568, EP-A 357 021 and DE 3 327 638).

In addition to these possible preparation methods, there are others, such as, for example, sintering of fine polymer powders or special processes as described in EP-A 289 238. However, the preparation of the microporous polymeric support is not restricted to the processes described here.

Examples for suitable microporous polymeric supports are commercially available (for example the $^R$Accurel grades from AKZO, such as $^R$Accurel-PE, $^R$Accurel-PP, $^R$Accurel-PA-6 or $^R$Accurel-PA-12, containing about 75% by volume of cavities). The pore size of the $^R$Accurel materials is 0.5–5 $\mu$m (PP), 1.0–5 $\mu$m (HDPE) and 0.5–3 $\mu$m (PA-6 and PA-12).

The present invention furthermore relates to a process for the preparation of the supported polymerization catalyst according to the invention, which comprises reacting the reaction product formed from an aluminoxane and at least one metallocene with a microporous, polymeric support.

The microporous, polymeric support is advantageously dried in advance, for example by treatment with alkylaluminum solutions, subsequently washed and rendered inert under a protective gas.

This is preferably carried out by first reacting the aluminoxane in a suitable solvent, for example pentane, hexane, heptane, toluene or dichloromethane, with at least one metallocene by vigorous mixing, for example by stirring. The reaction temperature is preferably from −20 to +120° C., in particular 15–40° C. The molar ratio between aluminum and the transition metal M of the metallocene is preferable between 10:1 and 10,000:1, in particular between 100:1 and 2,000:1. The reaction time is generally between 5 and 120 minutes, preferably 10–30 minutes. Preference is given to an aluminum concentration of greater than 0.01 mol/liter, in particular greater than 0.5 mol/liter. The reaction is carried out under inert conditions.

It is also possible to replace the aluminoxane by a mixture of an aluminoxane with a further alkylaluminum compound, such as, for example, trimethylaluminum, triethylaluminum or triisobutylaluminum, for the described reaction with the metallocene.

When the reaction is complete, some of the solvent can be removed, for example in vacuo, or replaced by another solvent after concentration. The solution prepared in this way is reacted in a suitable manner with the microporous, polymeric support. In this reaction, the support is added at least in an amount whose total pore volume is able to take up the solution from the preliminary reaction. This reaction is preferably carried out at temperatures between −20 and +120° C., in particular 15–40° C., by vigorous mixing, for example by stirring or treatment with ultrasound. Good homogenization should take place. The exchange of the inert gas of the pore volume can be accelerated, for example by brief evacuation.

In principle, the supported catalyst can also be prepared in a one-pot reaction, i.e. all 3 starting components are simultaneously reacted with one another in a suitable solvent/suspension medium. In this case, the amount of the polymeric support should preferably be such that it is able to take up the entire liquid volume.

The catalyst according to the invention can be metered into the polymerization system as a suspension in an inert suspension medium, such as, for example, heptane, n-decane, hexane or diesel oil, or alternatively in dry form, if necessary after removal of the residual solvent by a drying step, for example in vacuo.

The catalyst according to the invention can advantageously be prepolymerized in the gas phase, in the liquid monomer or in suspension, in which case additional further organoaluminum compound is unnecessary.

The present invention furthermore relates to a process for the preparation of an olefin polymer by polymerization or copolymerization of an olefin of the formula $R^a$—CH=CH—$R^b$, in which $R^a$ and $R^b$ are identical or different and are a hydrogen atom or a hydrocarbon radical having 1 to 14 carbon atoms, or $R^a$ and $R^b$, together with the atom connecting them, can form a ring, at a temperature of from −60 to 200° C., at a pressure of from 0.5 to 100 bar, in solution, in suspension or in the gas phase, in the presence of a catalyst, wherein the catalyst used is the reaction product according to the invention.

The polymerization or copolymerization is carried out in a known manner in solution, in suspension or in the gas phase, continuously or batchwise, in one or more steps, at a temperature of from −60 to 200° C., preferably from 30 to 80° C., particularly preferably from 50 to 80° C. Olefins of the formula $R^a$—CH=CH—$R^b$ are polymerized or copolymerized. In this formula, $R^a$ and $R^b$ are identical or different and are a hydrogen atom or an alkyl radical having 1 to 14 carbon atoms. However, $R^a$ and $R^b$ may also, together with the carbon atoms connecting them, form a ring. Examples of olefins of the formula $R^a$—CH=CH—$R^b$ are ethylene, propylene, 1-butene, 1-hexene, 4-methyl-1-pentene, 1-octene, norbornene, norbornadiene and 1,4,5,8-dimethano-1,2,3,4,4a,5,8,8a-octahydronaphthalene (DMON). In particular, propylene or ethylene are polymerized or copolymerized.

As molecular weight regulator and/or to increase the activity, hydrogen is added if necessary. The overall pressure in the polymerization system is from 0.5 to 100 bar. Polymerization is preferably carried out in the pressure range of from 5 to 64 bar which is particularly interesting industrially.

The catalyst according to the invention is preferably used in a concentration, based on the transition metal, of from $10^{-3}$ to $10_{-8}$, preferably from $10^{-4}$ to $10^{-7}$ mol of transition metal per dm$^3$ of solvent or per dm$^3$ of reactor volume.

If the polymerization is carried out as a suspension or solution polymerization, an inert solvent which is customary for the Ziegler low-pressure process is used. For example, the polymerization is carried out in an aliphatic or cycloaliphatic hydrocarbon; examples of these which may be mentioned are butane, pentane, hexane, heptane, isooctane, cyclohexane and methylcyclohexane.

It is furthermore possible to use a gasoline or hydrogented diesel oil fraction. Toluene can also be used. The polymerization is preferably carried out in the liquid monomer.

If inert solvents are used, the monomers are metered in in gas or liquid form.

The polymerization can have any desired duration, since the catalyst system to be used according to the invention exhibits only a slight time-dependent drop in polymerization activity.

Before the catalyst is introduced into the reactor, another alkylaluminum compound, such as, for example, trimethylaluminum, triethylaluminum, triisobutylaluminum or isoprenylaluminum, can additionally be added to the polymerization system in a concentration of from 1 to 0.001 mmol Al per kg of reactor contents in order to render the polymerization system inert (for example in order to remove catalyst poisons present in the olefin).

However, the use of further substances to catalyze the polymerization reaction is in principle unnecessary, i.e. the catalyst according to the invention can, and this is preferred, be used as the only catalyst for the olefin polymerization.

The molecular weight of the polymer formed can also be adjusted by changing the polymerization temperature, it also being possible to obtain polymers with a broad molecular weight distribution by periodic changes or by a multi-step process or by using a plurality of metallocenes.

In addition, the polymer molecular weight achieved by means of the solid catalyst according to the invention is determined by the type of metallocene used, by the aluminum compound and by the Al/M$^1$ ratio.

The catalyst described does not require any additional cocatalyst for activation and completely prevents the formation of reactor coatings.

An essential advantage of the catalyst according to the invention is the simple catalyst preparation method, which can be carried out easily and reproducibly, even on a relatively large scale. A further advantage is that the polymer product formed is not contaminated by foreign inorganic substances, which reduce the mechanical stability of the material. If the specific polymeric support is added in a relatively large amount, special polymer blends which have further advantageous properties can be prepared.

The examples which follow serve to illustrate the invention in greater detail:

All glass equipment was cleaned by heating in vacuo and flushed with argon. All operations were carried out in Schlenk vessels with exclusion of moisture and oxygen. The solvents used were in each case freshly distilled under argon over Na/K alloy and stored in Schlenk vessels.

The support materials were obtained as commercial products with the name $^R$Accurel from AKZO and were freed from impurities by extraction with toluene in a Soxhlet extractor under inert conditions, dried in vacuo and stored under argon.

Microporous HDPE is purchased as granules and first ground in a Retsch mill after cooling with liquid nitrogen. The screen fraction from 100 to 400 $\mu$m was used.

The microporous $^R$Accurel powders of PP and PA-6 were used as the screen fraction up to 200 $\mu$m and those of PA-12 were used as the screen fraction from 200 to 400 $\mu$m. The cavity content for all $^R$Accurel materials is 75% by volume. The pore size is 0.5–5 $\mu$m (PP), 1.0–5 $\mu$m (HDPE), and 0.5–3 $\mu$m (PA-6 and PA-12). The MFI 21.6 (190° C.) of the HDPE is 4.5, and the MFI 5 (230° C.) of the PP is 21.

The polymer melting points shown were taken from a DSC measurement for the 2nd melting (10°/min).

The aluminum determination of the aluminoxane was carried out by complexometric titration by the Schwarzenbach method after hydrolysis with water and sulfuric acid.

Methylaluminoxane is purchased from SCHERING AG as a 10% strength toluene solution and contains, according to aluminum determination, 36 mg of Al/ml. The mean degree of oligomerization, according to freezing-point depression in benzene, is p=20.

EXAMPLE 1

A solution of 1 μmol of biscyclopentadienylzirconium dichloride in 1 ml of toluene is mixed with 10 ml of a 10% strength by weight solution of methylaluminoxane in toluene, and, after a reaction time of 15 minutes, the mixture is evaporated in vacuo to a volume of 2 ml. In parallel, 4 g of $^R$Accurel-PA-6 powder in a screen fraction of smaller than 200 μm are dried in vacuo and flushed with argon. The support powder is stirred into the catalyst solution until homogeneous distribution has been achieved.
Polymerization:

A dry 1.5 dm$^3$ stirred reactor is flushed with nitrogen in order to remove the oxygen and filled with 0.9 dm$^3$ of an inert diesel oil (b.p. 100–120° C.). The reactor is flushed with ethylene and heated to 70° C., and the catalyst in powder form is metered in. The mixture is then polymerized at an ethylene pressure of 7 bar without additional activator. After 1 hour, the reactor is decompressed, and the polymer is filtered off from the suspension and dried for 12 hours in a vacuum drying cabinet, giving 18 g of polyethylene powder having a bulk density of 0.253 kg/dm$^3$ and a viscosity index VI of 389 cm$^3$/g. The polydispersity (according to GPC) is $M_w/M_n$=2.6. The reactor exhibits no coatings on the walls or the stirrer.

EXAMPLE 2

Example 1 is repeated, with the difference that 4 g of $^R$Accurel-PA-12 powder in a screen fraction of from 200 to 400 μm are employed as the support. The polymerization gives 25 g of polyethylene powder having a bulk density of 0.286 kg/dm$^3$ and a viscosity index VI of 370 cm$^3$/g. The polydispersity (according to GPC) is $M_w/M_n$=2.5. The reactor exhibits no coatings on the walls or the stirrer.

EXAMPLE 3

Example 1 is repeated, with the difference that 4 g of $^R$Accurel-HDPE powder are employed as the support. The polymerization gives 14 g of PE powder having a bulk density of 0.137 kg/dm$^3$ and a viscosity index VI of 390 cm$^3$/g. The polydispersity (according to GPC) is $M_w/M_n$=2.7. The reactor exhibits no coatings on the walls or the stirrer.

EXAMPLE 4

65 g of $^R$Accurel-PP powder in a screen fraction <200 μm are dried at 2 10$^{-4}$ mbar and flushed with argon. In parallel, 11.7 mg of biscyclopentadienylzirconium dichloride are dissolved in 300 ml of a 10% strength by weight solution of methylaluminoxane in toluene. The solution is stirred for 15 minutes and then evaporated in vacuo to a volume of 40 ml, and the dry powder is added. The gas in the pores of the support is removed by briefly applying a vacuum, and the solution is fully absorbed.

After a further 10 minutes of vigorous stirring, a homogeneous, finely divided and free-flowing powder is obtained. A 180 dm$^3$ reactor which has been rendered inert is filled with 80 l of diesel oil (b.p. 100–120° C.) and warmed to 50° C., and 3 bar of ethylene are introduced. The catalyst is suspended in 100 ml of n-decane and metered in via a lock. At the same time, the ethylene pressure is increased to 7 bar and the temperature is kept constant at 70° C. by cooling. After a polymerization time of 2 hours, the reactor is decompressed and the suspension is filtered off in a pressure filter. Drying in a vacuum drying cabinet gives 5.4 kg of polyethylene, corresponding to a reduced catalyst time yield of 9.6 [kg/(mmol·h·bar)] and a bulk density of 164 g/dm$^3$. The product has a density of 0.9438 g/cm$^3$, a viscosity index VI of 454 cm$^3$/g and a polydispersity (according to GPC) of $M_w/M_n$=2.7. The reactor exhibits no coatings on the wall and stirrer.

EXAMPLE 5

5.1 mg of rac-dimethylsilylbis-1-(2-methylindenyl) zirconium dichloride are dissolved in 40 cm$^3$ of a toluene solution of methylaluminoxane under Ar in a Schlenk flask, and reacted with the methylaluminoxane by being left to stand for 15 minutes. The resultant solution is concentrated to 8 ml in vacuo. 8 g of dry $^R$Accurel-PP powder (<200 μm) are added to this solution under Ar, and uniform distribution in the powder is ensured by shaking the flask; at the end, a free-flowing powder is obtained. In parallel, a dry 16 dm$^3$ reactor is flushed with nitrogen, filled with 10 dm$^3$ of liquid propene and heated to 30° C. The catalyst is subsequently blown into the reactor in powder form via a lock system, and the polymerization system is heated to the polymerization temperature of 70° C. (10° C./min) by supply of heat and kept at this temperature for 1 hour by cooling. The polymerization is then terminated by adding 5 ml of isopropanol, and the reactor is decompressed and opened. Vacuum drying of the product gives 0.4 kg of polypropylene having a viscosity index VI of 145 cm$^3$/g. The median particle diameter $d_{50}$, according to screen analysis, is 650 μm, with a proportion of fine particles (<100 μm) of 1% by weight. The reactor exhibits no coatings on the wall and stirrer.

COMPARATIVE EXAMPLE 1

In order to prepare the catalyst, 5.2 mg of rac-dimethylsilylbis-1-(2-methylindenyl)zirconium dichloride are dissolved in 20 cm$^3$ of a toluene solution of methylaluminoxane and reacted with the methylaluminoxane by being left to stand for 15 minutes. In parallel, a dry 16 dm$^3$ reactor is flushed with nitrogen and filled with 10 dm$^3$ of liquid propene. 30 cm$^3$ of a toluene solution of methylaluminoxane are introduced into this reactor and stirred at 30° C. for 15 minutes. The catalyst, which is then ready, is subsequently introduced into the reactor, and the polymerization is carried out as in Example 5. After the reactor is opened, a continuous coating with a thickness of 3 mm is evident on the wall and stirrer. Vacuum drying of the product gives 1.3 kg of polypropylene having a viscosity index VI of 151 cm$^3$/g and a melting point (DSC) of 145° C. The median particle diameter $d_{50}$ according to screen analysis is 350 μm.

EXAMPLE 6

5.5 mg of isopropylidene(9-fluorenyl)(cyclopentadienyl) zirconium dichloride are dissolved in 40 cm$^3$ of a toluene solution of methylaluminoxane under argon in a Schlenk flask and are reacted with the methylaluminoxane by being left to stand for 15 minutes. The resultant solution is concentrated to 10 ml in vacuo. 10 g of $^R$Accurel-PA-6 powder in a screen fraction of smaller than 200 μm are added under argon to this solution, and uniform distribution in the powder is ensured by shaking the sample. A free-flowing powder is obtained.

In parallel, a dry 16 dm$^3$ reactor is flushed with ethylene and charged with 6 dm$^3$ of an 85% strength norbornene solution in toluene. At 70° C., an ethylene partial pressure of 6 bar is established in the reactor, and the catalyst is blown into the reactor in powder form via a lock system. During the subsequent one-hour polymerization, the ethylene partial pressure is kept constant at 6 bar by topping up. The reactor is then vented, and the reactor contents are stirred for 30 minutes with 100 cm³ of water and filtered. The clear solution is slowly added to 50 dm³ of acetone, the mixture is stirred for minutes, and the precipitated polymer is filtered off and washed with acetone. Drying at 80° C. in vacuo gives 375 g of ethylene-norbornene copolymer which has a viscosity index VI of 219 cm³/g and a glass transition temperature of 152° C.

We claim:

1. A process for the preparation of an olefin polymer by polymerization of at least one olefin of the formula $R^a$—CH=CH—$R^b$, in which $R^a$ and $R^b$ are identical or different and are a hydrogen atom or a hydrocarbon radical having 1 to 14 carbon atoms or $R^a$ and $R^b$, together with the atoms connecting them, form a ring, said process consists essentially of polymerizing said olefin, alone or in combination with at least one additional olefin, in the presence of a supported catalyst consisting essentially of a reaction product formed from an aluminoxane and at least one metallocene with a thermoplastic microporous, polymeric support, and wherein said thermoplastic microporous, polymeric support has a pore volume of at least 50% by volume, based on the total volume of the support material.

2. The process as claimed in claim 1, wherein propylene or ethylene is polymerized or copolymerized.

3. The process as claimed in claim 1, wherein a said olefin is polymerized in a reactor at a temperature of from −60 to 200° C., at a pressure of from 0.5 to 100 bar, in solution, in suspension or in the gas phase.

4. The process claimed in claim 3, wherein said catalyst comprises irregular or spherical particles, and wherein, at the conclusion of the polymerization, the walls of said reactor are free of any coating of polymerized olefin.

5. The process as claimed in claim 1, wherein the thermoplastic microporous, polymeric support is polyethylene, polypropylene, polystyrene, polyvinyl chloride, acrylonitrile-butadiene-styrene copolymer, polyamide, polymethylmethacrylate or polycarbonate.

6. The process as claimed in claim 5, wherein the catalyst is a reaction product formed from an aluminoxane and at least one zirconocene and is then reacted with said thermoplastic microporous polymeric support.

7. The process as claimed in claim 6, wherein said zirconocene is a tetrahydroindenyl zirconium dichloride.

8. The process as claimed in claim 7, wherein said aluminoxane is a compound of the formula (II)

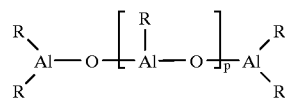

(II)

for the linear type and/or the formula (III)

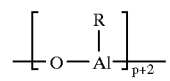

(III)

for the cyclic type, where, in the formulae (II) and (III), the radicals R may be identical or different and are a ($C_1$–$C_6$)-alkyl group, a ($C_6$–$C_{18}$)-aryl group, benzyl or hydrogen, and p is an integer from 2 to 50.

9. The process as claimed in claim 1, wherein said microporous structure has small pore openings which have a diameter from about 0.1 to 10 μm.

10. The process as claimed in claim 9, wherein said pore openings are part of a cell and diameter of the pore openings is in the range of 1/5 to 1/50 of the cell diameter.

11. The process as claimed in claim 10, wherein said diameter of the pore openings is in the range of not greater than 1/10 of the cell diameter.

12. The process as claimed in claim 8, wherein said microporous structure has small pore openings which have a diameter from about 0.1 to 10 μm.

13. The process as claimed in claim 12, wherein said pore openings are part of a cell and diameter of the pore openings is in the range of 1/5 to 1/50 of the cell diameter.

14. The process as claimed in claim 13, wherein said diameter of the pore openings is in the range of not greater than 1/10 of the cell diameter.

15. The process as claimed in claim 1, wherein said thermoplastic microporous, polymeric support has a pore volume of at least 70% by volume, based on the total volume of the support material.

16. The process as claimed in claim 5, wherein said thermoplastic microporous, polymeric support has a pore volume of at least 70% by volume, based on the total volume of the support material.

17. The process as claimed in claim 14, wherein said thermoplastic microporous, polymeric support has a pore volume of at least 70% by volume, based on the total volume of the support material.

18. The process as claimed in claim 1, wherein said supported catalyst consists of an aluminoxane and at least one metallocene on a thermoplastic microporous, polymeric support and wherein said thermoplastic microporous, polymeric support has a pore volume of at least 70% by volume, based on the total volume of the support material, and said thermoplastic microporous support is polyethylene, polypropylene, polystyrene, polyvinyl chloride, acrylonitrile-butadiene-styrene copolymer, polyamide, polymethylmethacrylate or polycarbonate.

19. The process as claimed in claim 17, wherein said supported catalyst consists of an aluminoxane and a tetrahydroindenyl zirconium dichloride metallocene on said thermoplastic microporous, polymeric support.

20. The process as claimed in claim 1, wherein said process consists of polymerizing said olefin, alone or in combination with at least one additional olefin, in the presence of a supported catalyst consisting of a reaction product formed from an aluminoxane and at least one metallocene on a thermoplastic microporous, polymeric support, and wherein said thermoplastic microporous, polymeric support has a pore volume of at least 50% by volume, based on the total volume of the support.

* * * * *